Figure 1:
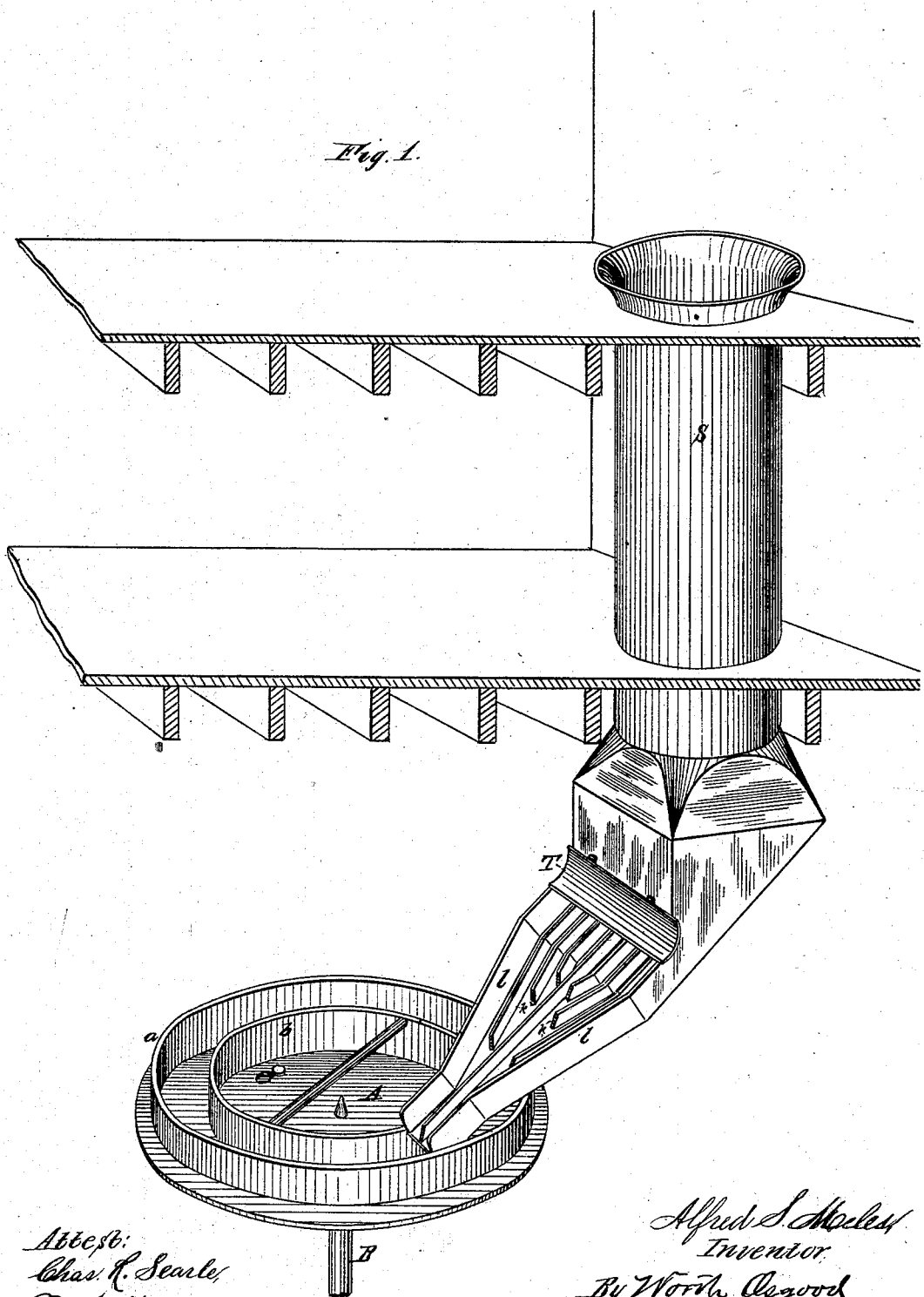

(Model.) 2 Sheets—Sheet 1.

A. S. MILES.
Method of and Machinery for Arranging Bristles.

No. 240,036. Patented April 12, 1881.

Attest:
Chas. R. Searle,
W. J. Morgan.

Alfred S. Miles,
Inventor,
By Worth Osgood,
Attorney.

N. PETERS, PHOTO-LITHOGRAPHER, WASHINGTON, D. C.

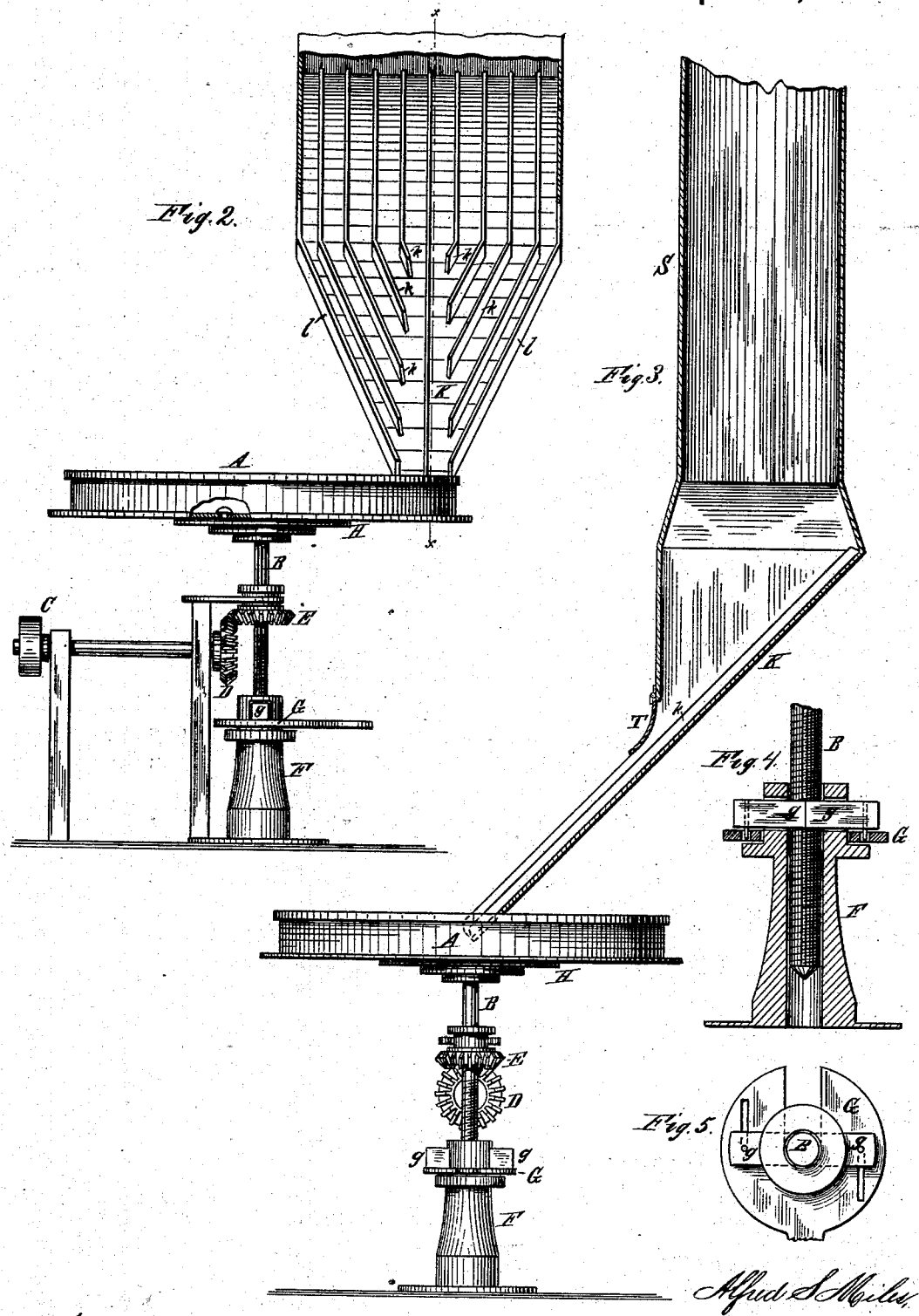

UNITED STATES PATENT OFFICE.

ALFRED S. MILES, OF BROOKLYN, ASSIGNOR TO MILES BROTHERS & CO., OF NEW YORK, N. Y.

METHOD OF AND MACHINERY FOR ARRANGING BRISTLES.

SPECIFICATION forming part of Letters Patent No. 240,036, dated April 12, 1881.

Application filed March 5, 1881. (Model.)

*To all whom it may concern:*

Be it known that I, ALFRED S. MILES, of Brooklyn, county of Kings, and State of New York, have invented certain new and useful Improvements in Methods of and Machinery for Arranging Bristles, of which the following is a full, clear, and exact description, reference being had to the accompanying drawings, and to the letters of reference marked thereon.

Figure 1 is a perspective view, illustrating a chute arranged in connection with a receiving-tray, these being the principal features of the best form of an apparatus which I have devised for the purpose of carrying out the principles of my invention. Fig. 2 is a front elevation, showing the receiving-tray and its support and the arrangement of strips upon the inclined base of the chute; and Fig. 3 is a section and elevation upon a plane at right angles to that of Fig. 2 and passing through the line *x x*. Fig. 4 is a sectional view, and Fig. 5 a plan representing, in detail, the means employed for elevating and depressing the revolving tray.

Like letters in all the figures indicate corresponding parts.

After the bristles are pulled from the skin of the hog they are in a wet and greasy condition, and remain matted together in locks or bunches, so that the workmen are enabled to select and assort the different colors with comparatively little difficulty. In the operations of washing, bleaching, combing, and dragging, (assorting into sizes,) a large percentage of the bristles become reversed or turned the wrong way, and when the brush-manufacturer receives them from the dealers therein they contain from five to thirty per cent. of butts or root ends, which are mixed with the flags, soft ends or working part of the bristles. Inasmuch as these butts, if left in with the soft ends of the bristles, would, when made into a brush, cause the paint or varnish to look streaked, it is necessary to take them out or separate them from the rest of the mass. This is accomplished by the workman holding a bunch by the root or butt end and pushing into and rubbing the soft or flag ends over a fine-wire sieve. The holes in the sieve, being of the proper size, catch and pull out the butts. The bristles thus pulled out fall on the bench or floor in a mixed state, and this mass is called "rifflings," which term is applied to all droppings or waste bristles which are made in manipulating the same. The present mode of getting the riffling into condition to be used again is a slow and costly one, and the operation as now performed is as follows: The mass is shaken upon the floor to loosen and separate it, and it is then pulled apart and manipulated by the workmen in handfuls until the bristles are straight and even on the ends. As the butts and flags after this process are mixed, pointing half one way and half the other, it is necessary to separate them from each other. This is done by the workman who places a thin layer upon a board prepared for the purpose, places the sharp edge of a thin stick of wood upon the center of the layer, and gently moves the stick to and fro, meantime pressing down upon it so as to cause sufficient friction. Under this treatment the butts or root ends will gradually slip from under the stick, the bristles going each side of the same and leaving a clear space under the stick. The bristles having been thus divided into two separate layers, the soft or flag ends of which point toward each other, the workman has but to put them together in proper shape and the work of turning the bristles all one way is accomplished; but neither of these methods of manipulating the bristles has afforded a satisfactory or complete arrangement, owing to the practical impossibility of operating upon each individual bristle, so that all merchantable bristles have to be reworked before they are in a condition fit for the use of the brush-maker, involving a considerable expenditure of time and labor.

To obviate this necessity for a reworking, to make the operations of straightening and arranging the bristles simple, easy, and accurate, and to enable the operator to straighten and arrange a considerable quantity at one time, are among the chief objects of my invention. To accomplish these objects I avail myself of this peculiarity of the bristle, viz: that its center of gravity is located considerably nearer the butt than the flag end.

It will be observed that if a bristle be allowed to drop from a sufficient height in a quiet atmosphere it will invariably strike upon its root end first, the mechanical reasons for which it is unnecessary to explain. If, now, a number of bristles be carefully separated, so as not to interfere with each other, and all allowed to drop, each will strike precisely as the single one would strike; and if some means be adopted for catching the bristles after they strike and maintaining them with their butt-ends all in the one direction, the desired straightening and arranging will be completed at the one operation.

The operation of mixing bristles is also an important feature of my invention.

The present mode of mixing bristles—viz., black with white, and yellow, white, and black to obtain a gray, or of combining several different sizes so as to taper the bristles—is accomplished as follows: The different kinds of bristles to be mixed are placed in thin layers, one on top of the other, and the workman, cutting down through the mass at either end, takes a bunch large enough to hold in both hands, and then, by clasping and holding the bunch by the flag end and drawing the other through a large steel tooth comb a great number of times, meanwhile dividing and subdividing the bunch very often, finally brings the bristles to a thoroughly-mixed condition of uniform color or quality.

By dropping several qualities of bristles into the chute and catching and holding them after their descent, in accordance with my improved method, not only is the process of straightening and arranging, but also that of mixing, accomplished at the one operation, thereby effecting a considerable saving in time and labor.

For the more complete, thorough, and uniform mixture of several qualities, it may be found desirable to pass the bristles through the apparatus a second time, though for all ordinary uses one operation will be found sufficient, if care be taken to feed in the different qualities in uniform quantities or with uniform velocity.

For catching and holding the bristles after having been dropped the apparatus shown in the accompanying drawings is the best which I have been able to devise. It consists, essentially, of a revolving tray, A, mounted upon an upright shaft, B, which is or may be kept turning through the medium of a pulley, C, or other mechanical device to be driven by power or otherwise, which pulley communicates its motion to the shaft through the medium of the bevel-wheels D E. The shaft is made capable of vertical adjustment by use of a feather in wheel E, which permits vertical movements, while it compels always the required rotary movements.

Upon the column or standard F is collared the cam-plate G, which controls the movements of the two blocks $g\,g$, screw-threaded upon their interior surfaces to correspond with the shaft B. The shaft being supposed to be revolving, it will readily appear that when the cam-plate is so turned as to force the two blocks $g\,g$ into contact with the shaft they will cause the latter to gradually descend in accordance with the pitch of the screw-threads and the velocity with which the shaft is revolved, the direction of its motion being such as to always cause it to descend under the action of the screw rather than to ascend.

Upon the upper end of the shaft is a supporting-plate, H, which is provided with a couple of pins adapted to fit into corresponding slots in the central portion of the bottom of the tray A, and to connect the tray with the shaft in such a manner that the two must, when in proper place, revolve together. From this plate the tray may be readily disconnected and its place supplied by another.

The chute for the bristles (represented at S) may be of any desired and convenient height and form, care being taken that it be located and arranged so as to avoid any excess of upward draft of air through it which might interfere with the successful workings of the process, and also to have it plenty large enough to permit the natural turning of the bristles under the action of the force of gravity. It is preferred that this chute be made circular in horizontal section, or nearly circular, substantially as indicated in Fig. 1, for the reason that if made square or angular the bristles are found to settle into the corners more rapidly than into the central parts, (owing to a different condition of the atmosphere therein,) and thus impair the successful operation of the apparatus in a degree. If the chute be built square or angular, however, the disadvantageous effects of the corners may be obviated by simply placing corner-pieces therein adapted to reduce the interior space more nearly to the form of a cylinder, or the whole may be lined with a cylinder of metal, in which event the angular chute would form a convenient support and protection for its lining.

The particular method of constructing the chute and its particular form of horizontal section or the material of which it is to be made are no material parts of my invention, since these features may be variously modified to suit the circumstances or surroundings of any particular case.

The bottom K is considerably inclined with reference to the axis of the chute, in order that when the butt-ends of the bristles strike it they will be forced in the direction of the lowermost end of the bottom, and this bottom is also provided with a series of narrow vertical ridges, $k\,k$, and suitable side pieces, $l\,l$, calculated to direct the mass into a gradually-contracted trough, into which the whole bottom is finally merged, and intended to prevent the bristles from turning upon the bottom after striking. The contracted form of the discharge end facilitates the delivery of the bristles into the receiving-tray and maintains them in their straightened and arranged positions until delivered.

The tray has the exterior wall, $a$, and the interior wall, $b$, forming an annular space about the width of the discharge end of the aforementioned trough, and into which the discharge end is made to project, as clearly indicated.

The tray being set in motion and the bristles being fed into the chute, it is obvious that they will be discharged in a continuous stream into the annular compartment of the tray, the butts all lying in one direction. As the feeding is continued, of course the layer of manipulated bristles gradually increases in height, and the screw-threaded shaft gradually lowers the tray to compensate for this increase, so that the mouth of the chute shall not be brought in contact with and thereby disarrange any of the bristles. The tray having been filled, the feeding is stopped for an instant, the tray removed, and its place supplied by another ready at hand. The blocks $g\ g$ are then thrown out of gear with the shaft, the shaft elevated by hand, the blocks again thrown into gear, and the feeding resumed. These adjustable screw-threaded blocks $g\ g$ are similar in themselves to others heretofore used for various purposes, and are not therefore herein specifically claimed as new. After the bristles are collected and arranged in the annular compartment of the tray, the operator simply separates a handful from the mass, brings the butts to the same level by thumping them upon the table in the usual way, and they are ready to be delivered to the brush-maker.

For carrying out my improved methods there may be many ways devised for delivering the bristles from the chute. So, also, there may be many ways of catching the bristles at the bottom of the chute—as, for instance, upon a brush which would maintain them with their flag ends uppermost, to be afterward removed by hand or otherwise. The apparatus shown in the accompanying drawings is, however, found in practice to admirably answer all the purposes and objects of the invention and to give excellent practical results.

The revolving tray might be replaced by an endless belt or apron or other device calculated to receive the bristles from the discharge end of the chute.

At T is shown a narrow door, serving to exclude a considerable quantity of air from the chute, and affording means by which the interior portion of the bottom may be made accessible, in order to remove any obstruction which might collect upon it, while at the same time the door does not interfere with the ordinary and desirable free flow of the mass of manipulated bristles.

Any means for feeding the bristles in at the top of the chute may be adopted. They should be fed in a comparatively-uniform manner, care being taken to prevent them from falling in clumps, as previously intimated. They might be conveniently blown in by a simple apparatus, the ejecting blast from which would be sufficient to separate them nicely, while it would also operate to prevent the disadvantages of an upward draft through the chute.

In connection with the feeding-blower, an ordinary picker might be used to facilitate the desired separation.

The invention contemplates a complete arrangement for automatically operating upon bristles—that is, for straightening, arranging, and mixing them—operations which have heretofore been accomplished almost exclusively by hand labor. While the adjuncts mentioned might be desirable, they are not to be understood as in any way forming any indispensable part of the present invention, and they may be hereafter made the subject of separate applications for Letters Patent.

The obviously useful characteristics of the methods or processes and the apparatus above described will commend the invention for adoption in the initiatory preparation of the bristles, in re-preparing them, or under other circumstances requiring that they be straightened, arranged, or mixed.

Having now fully described my invention, what I claim as new, and desire to secure by Letters Patent, is—

1. As an improvement in the art of manipulating or preparing bristles for brush-making, the herein-described method of straightening and arranging them—that is to say, by dropping them or allowing them to fall freely and uninterruptedly in a separated condition down through a suitable free open space, preventing them from turning after having fallen, and delivering them with their butt-ends lying in one direction—substantially as hereinbefore set forth.

2. As an improvement in the art of manipulating or preparing bristles for brush-making, the method herein described for mixing two or more qualities of bristles—that is to say, by feeding them uniformly in a separated condition, allowing them to fall freely and uninterruptedly down through a suitable free open space, preventing them from turning after having been dropped, and delivering the mass in a gradually-contracted condition with the butt-ends lying in one direction—substantially as hereinbefore set forth.

3. In an apparatus for manipulating bristles, the combination, with the chute within which the bristles are allowed to fall freely and uninterruptedly through a sufficient distance, of an inclined bottom adapted to receive the impact of the butt-ends of the bristles, and to direct them toward the mouth or outlet of the chute, with their butt or root ends projected toward the lowermost point of said outlet, substantially as and for the purposes hereinbefore set forth.

4. In an apparatus for manipulating bristles, the combination, with the chute within which the bristles are allowed to fall freely and uninterruptedly down through a sufficient distance, of an inclined bottom adapted to receive the impact of the butt-ends of the bristles, and to direct them toward the mouth or outlet of the chute, with their butt or root ends projected toward the lowermost point of said outlet, the inclined bottom being supplied with a number of narrow strips or ridges, and being gradually contracted, substantially as and for the purposes hereinbefore set forth.

5. In an apparatus for manipulating bristles, the combination, with a chute within which the bristles are allowed to fall freely and uninterruptedly down through a sufficient distance, said chute being provided with an inclined and gradually-contracted bottom, of a revolving tray adapted to receive and hold the straightened and arranged bristles, substantially in the manner and for the purposes explained.

6. In an apparatus for manipulating bristles, the combination, with a chute provided with an inclined and gradually-contracted bottom, of a revolving tray adapted to receive and hold the straightened and arranged bristles, said tray being detachably mounted upon a vertically-adjustable shaft, substantially as and for the purposes explained.

7. In an apparatus for manipulating bristles, the combination of the vertical revolving screw-threaded shaft, the driving attachments, the adjustable screw-threaded blocks, and the detachable tray mounted upon said shaft, the whole adapted to operate substantially in the manner and for the purposes hereinbefore set forth.

In testimony that I claim the foregoing I have hereunto set my hand in the presence of two witnesses.

ALFRED S. MILES. [L. S.]

Witnesses:
CHARLES E. FALES,
HARRY S. MOSEMAN.